(12) United States Patent
Lin

(10) Patent No.: US 6,256,901 B1
(45) Date of Patent: Jul. 10, 2001

(54) MEASURING TAPE

(76) Inventor: Hsin-Yun Lin, No. 17, Chuan Yuan Street, Taichung (TW)

( * ) Notice: Subject to any disclaimer, the term of this patent is extended or adjusted under 35 U.S.C. 154(b) by 0 days.

(21) Appl. No.: 09/479,055

(22) Filed: Jan. 7, 2000

(51) Int. Cl.$^7$ .................................................. G01B 3/10
(52) U.S. Cl. ............................... 33/767; 33/334; 33/354; 33/755
(58) Field of Search ..................... 33/768, 333, 334, 33/348, 354, 755, 759, 760, 761, 767, 770

(56) References Cited

U.S. PATENT DOCUMENTS

| | | | |
|---|---|---|---|
| 101,773 | * | 4/1870 | Sharp ...................................... 33/334 |
| 823,373 | * | 6/1906 | Tatum ..................................... 33/761 |
| 2,814,881 | * | 12/1957 | Ljungberg .............................. 33/767 |
| 2,992,487 | * | 7/1961 | Miller .................................... 33/760 |
| 4,153,996 | * | 5/1979 | Rutty ..................................... 33/767 |
| 4,580,347 | * | 4/1986 | Mcknight ............................... 33/760 |
| 4,899,460 | * | 2/1990 | Kang ...................................... 33/767 |
| 5,388,337 | * | 2/1995 | Powers, II .............................. 33/354 |
| 5,395,069 | * | 3/1995 | Chen ..................................... 33/767 |
| 6,032,380 | * | 3/2000 | Li .......................................... 33/755 |
| 6,085,433 | * | 7/2000 | Li .......................................... 33/755 |
| 6,167,635 | * | 1/2001 | Lin ........................................ 33/755 |

FOREIGN PATENT DOCUMENTS

2229533 * 9/1990 (GB) .................................. 33/760

* cited by examiner

Primary Examiner—Christopher W. Fulton
(74) Attorney, Agent, or Firm—Browdy and Neimark

(57) ABSTRACT

A measuring tape comprises a housing in which a pivot is disposed for mounting a reel. A tape blade is releasably wound on the reel such that the tape blade can be pulled out of an opening of the housing. The bottom of the housing is provided with an action slot in which a stop member is slidably disposed. As the stop member is pushed forward, the press portions of the front end of the stop member and the urging portion of an arresting piece pivoted in the housing work together to prevent the rewinding of the tape blade. When the stop member is pushed backward, the arresting piece is pushed to swivel backward so as to move away from the tape blade, thereby enabling the tape blade to be rewound.

10 Claims, 6 Drawing Sheets

MEASURING TAPE

FIELD OF THE INVENTION

The present invention relates generally to a measuring tool, and more particularly to a measuring tape.

BACKGROUND OF THE INVENTION

As shown in FIG. 1, a measuring tape of the prior art comprises a bottom housing 2, a cover 3, a reel 4 on which a tape blade 5 is wound, a press button 8 for actuating a tape-stopping member 6.

As shown in FIG. 2, the tape blade 5 is wound on the reel 4 such that the tape blade 5 is automatically rewound as soon as the tape blade 5 is pulled out unless the press button 8 is pressed. The user of the prior art measuring tape may be too busy to keep pressing the press button 8 while using the measuring tape. A forgetful user of the prior art measuring tape is apt to forget pressing the press button 8 while using the measuring tape. Some users may be even annoyed by the inconvenience in using the prior art measuring tape.

SUMMARY OF THE INVENTION

It is the primary objective of the present invention to provide a measuring tape with a means for preventing the tape blade of the measuring tape from being rewound as soon as the tape blade is pulled out.

It is another objective of the present invention to provide a measuring tape which is simple in construction and is thus cost-effective.

In keeping with the principle of the present invention, the foregoing objectives of the present invention are attained by a measuring tape, which comprises a housing in which a pivot is disposed such that a reel is mounted on the pivot. A tape blade is wound on the reel such that the tape blade can be pulled out of the housing via an opening of the bottom of the housing, and that the tape blade is prevented from being rewound by a stop member which is movably disposed in an action slot of the bottom of the housing. As the stop member is pushed forward, the press portions of the front end of the stop member and the urging portion of an arresting portion pivoted in the housing work together to prevent the rewinding of the tape blade. When the stop member is pushed backward, the arresting piece is caused to swivel backward so as to move away from the pliable tape blade, thereby enabling the tape blade to be rewound.

The foregoing objectives, features, functions, and advantages of the present invention will be more readily understood upon a thoughtful deliberation of the following detailed description of the preferred embodiments of the present invention with reference to the accompanying drawings.

DETAILED DESCRIPTION OF THE INVENTION

Figure 1:
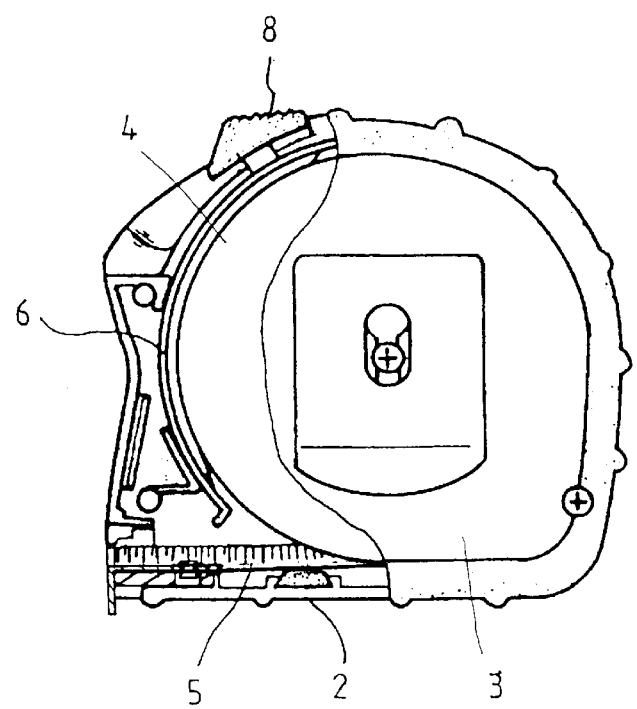
FIG. 1 shows a partial front sectional view of a measuring tape of the prior art.
Figure 2:
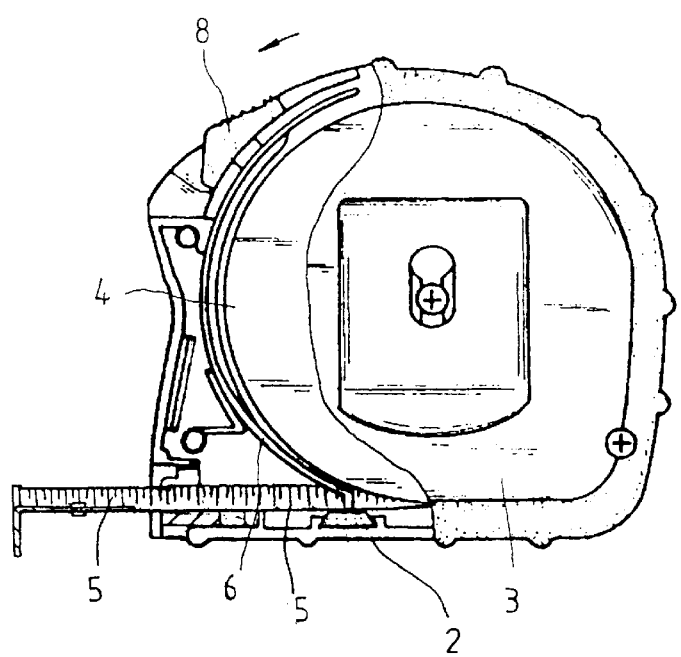
FIG. 2 shows a schematic view of the prior art measuring tape in use.
Figure 3:
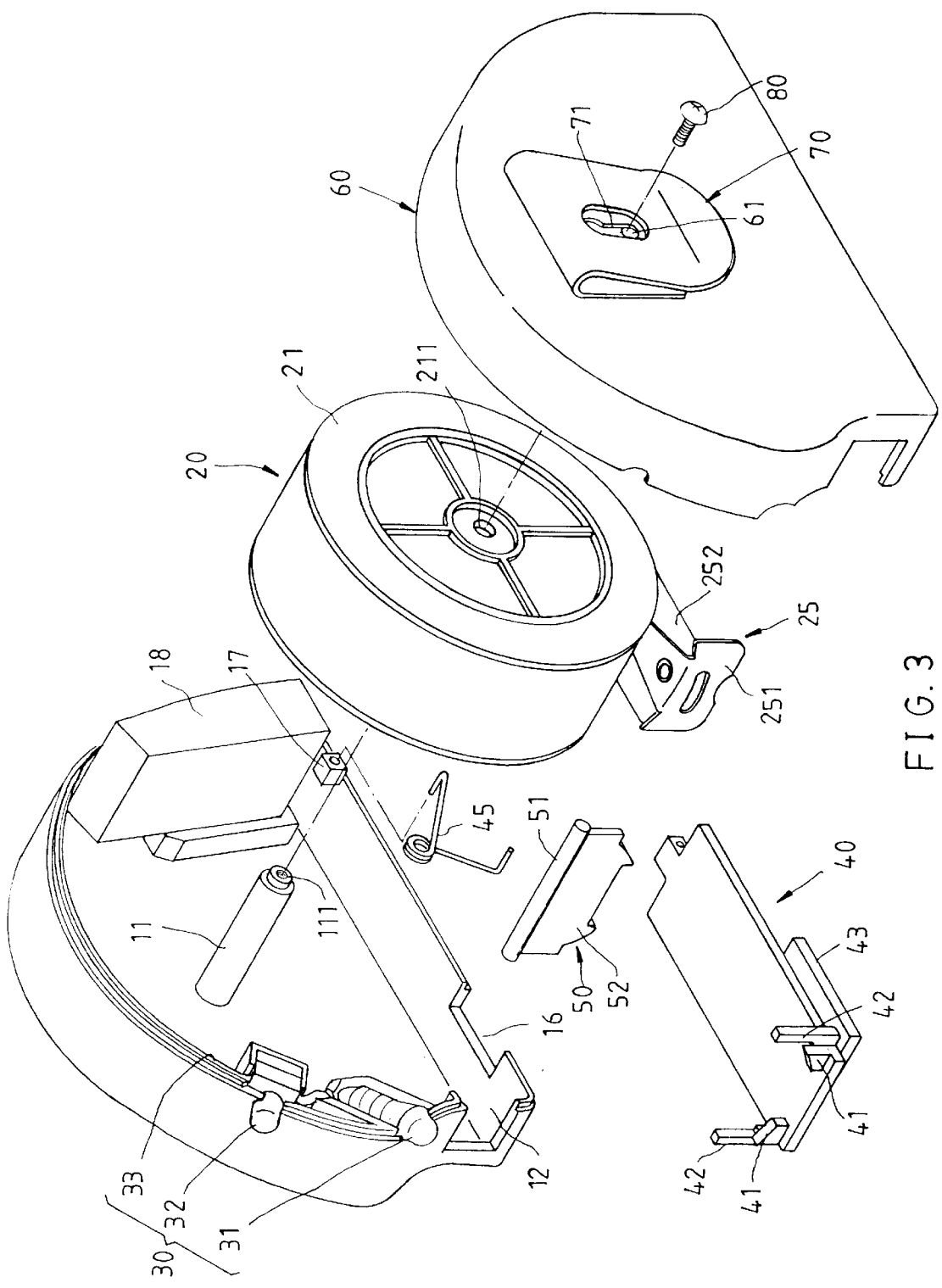
FIG. 3 shows an exploded view of a first preferred embodiment of the present invention.
Figure 4:
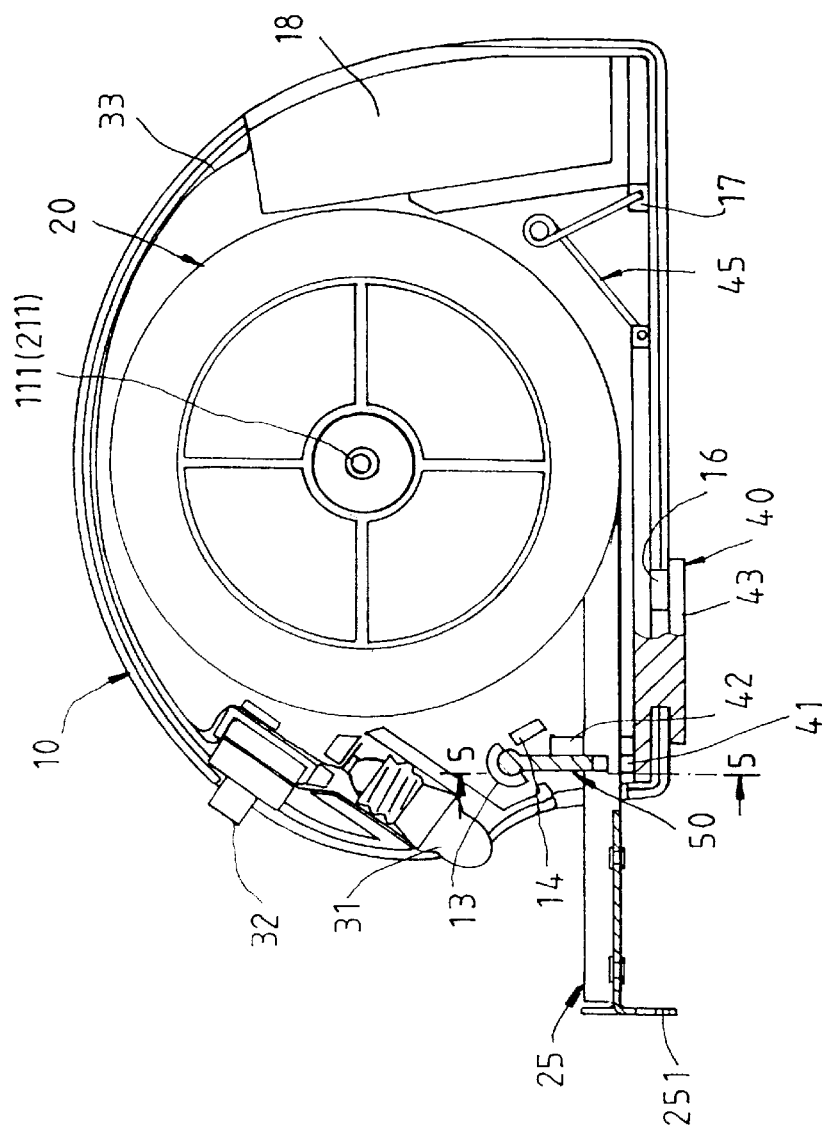
FIG. 4 shows a front view of the first preferred embodiment of the present invention with the top housing thereof being removed.
Figure 5:
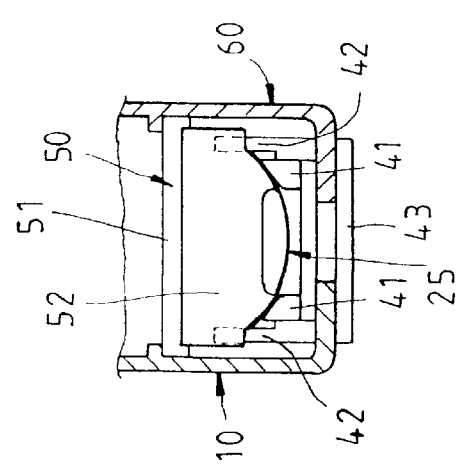
FIG. 5 shows a sectional view taken along the direction indicated by a line 5—5 as shown in FIG. 4.
Figure 6:
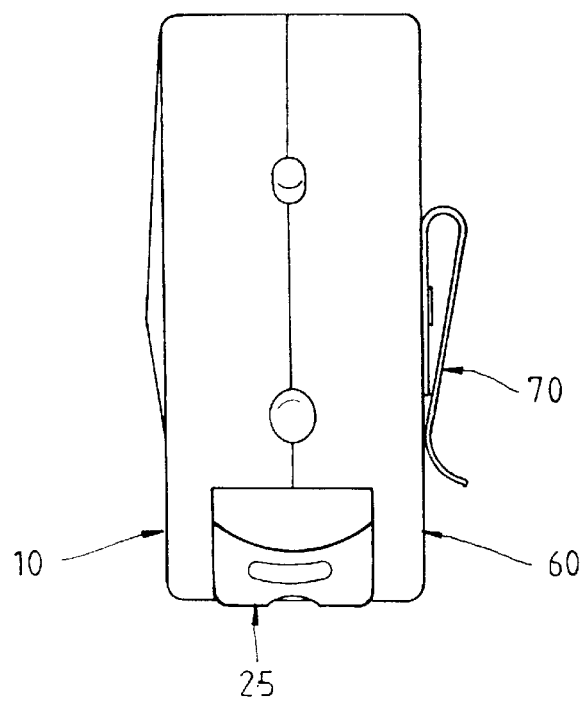
FIG. 6 shows a left view of the first preferred embodiment of the present invention.

As shown in FIGS. 3–6, a measuring tape of the first preferred embodiment of the present invention comprises the component parts, which are described hereinafter.

A bottom housing 10 is provided with a pivot 11 which is mounted at the center of the interior of the bottom housing 10. The pivot 11 is provided at the top end thereof with a threaded hole 111. The bottom housing 10 is provided in the lower edge of the front end thereof with an opening 12, and in the interior of the front end thereof with a pivot seat 13. A locating block 14 is disposed in a predetermined position of the bottom housing 10. An action slot 16 is provided at the lower end of the bottom housing 10. A spring retaining portion 17 is located at the lower edge of the rear end of the bottom housing 10. The bottom housing 10 is provided in the rear side thereof with a battery mount 18.

A reel 20 has a round body 21 which is provided at the center thereof with a pivot hole 211 for receiving the pivot 11 of the bottom housing 10. The reel 20 is provided therein with a volute spring (not shown in the drawings). A pliable tape blade 25 is wound on the reel 20 and is provided at the front end thereof with a hooked portion 251. The tape blade 25 has a marked surface 252.

A lighting set 30 is provided with a lamp body 31 located over the opening 12 of the bottom housing 10, a switch 32 disposed in the upper portion of the bottom housing 10 to allow the thumb an easy access to the switch 32, and a circuit 33 connected with the battery mount 18 of the bottom housing 10.

A stop member 40 is slidably disposed in the action slot 16 of the bottom housing 10 and is provided at the front end thereof with two press portions 41 and two push portions 42 to accommodate the tape blade 25. The stop member 40 is provided in the underside thereof with a pressing portion 43, and at the rear end thereof with a torsion spring 45.

An arresting piece 50 has a pivoting portion 51 which is pivoted with the pivot seat 13 of the bottom housing 10 such that the arresting piece 50 swivels on the pivoting portion 51. The arresting piece 50 further has an urging portion 52 capable of curving to press against the marked surface 252 of the tape blade 25.

A top housing 60 is corresponding in shape to the bottom housing 10 and is joined with the bottom housing 10. The top housing 60 is provided with a fastening hole 61 corresponding in location to the threaded hole 111 of the bottom housing 10, and is further provided in the interior thereof with a pivot seat and a locating block, which are opposite in location to the bottom housing 10 and are not shown in the drawings.

A lug 70 is provided with a fastening hole 71 and is fastened with the top housing 60 by a fastening bolt 80 which is engaged with the threaded hole 111 via the fastening hole 71 of the lug 70 and the fastening hole 61 of the top housing 60. The lug 70 is used to attach the measuring tape to the tool bag or the belt of a worker.

Figure 7:
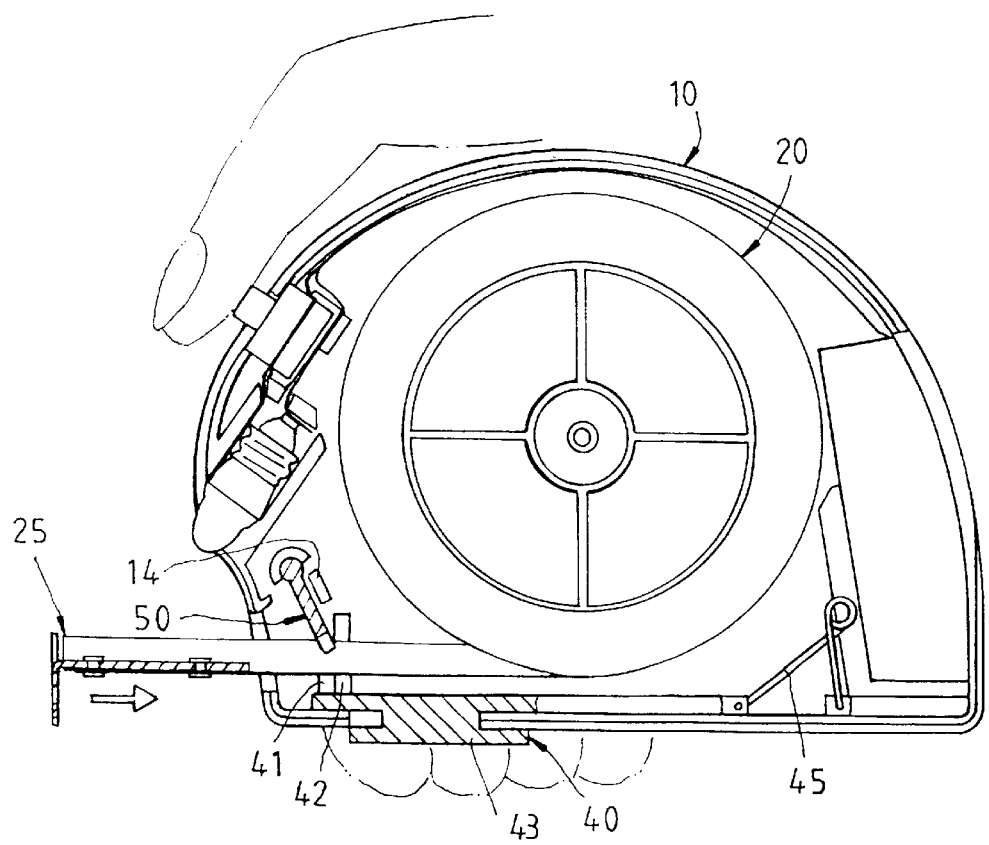
FIG. 7 shows a front view of the first preferred embodiment of the present invention in action.

As illustrated in FIG. 7, the side of the measuring tape of the present invention is held in the palm of the hand of a user of the measuring tape such that the switch 32 of the lighting set 30 is corresponding in location to the thumb, and that the pressing portion 43 of the stop member 40 can be easily pushed by the index finger or middle finger.

In taking a measurement with the measuring tape of the present invention, the hooked portion 251 of the tape blade 25 is retained by an object or other hand such that the tape blade 25 is pulled out a distance as desired. As soon as the tape blade 25 is stopped being pulled out, the tape blade 25 is pressed against by the arresting piece 50 and is obstructed at the same time by the push portion 42 of the stop member 40. As a result, the marked surface 252 of the tape blade 25 is jointly pressed against by the urging portion 52 of the arresting piece 50 and the press portions 41 of the stop member 40. Under such a circumstance as described above, the tape blade 25 remains stationary. The tape blade 25 can be caused to rewind by pushing the stop member 40 rearwards so as to relieve the arresting piece 50 of the obstruction of the press portions 42 of the stop member 40, thereby enabling the arresting piece 50 to swivel rearwards. In the meantime, the marked surface 252 of the tape blade 25 is no longer pressed against by the urging portion 52 of the arresting piece 50. The tape blade 25 is thus rewound. The locating block 14 of the bottom housing 10 is intended to prevent the arresting piece 50 from swiveling rearward excessively.

If the stop member 40 is relieved of the pressure exerting thereon, the stop member 40 is pushed forward by the torsion spring 45. The arresting piece 50 swivels forward to arrest the tape blade 25 in motion, thereby stopping the tape blade 25 from being rewound.

Figure 8:
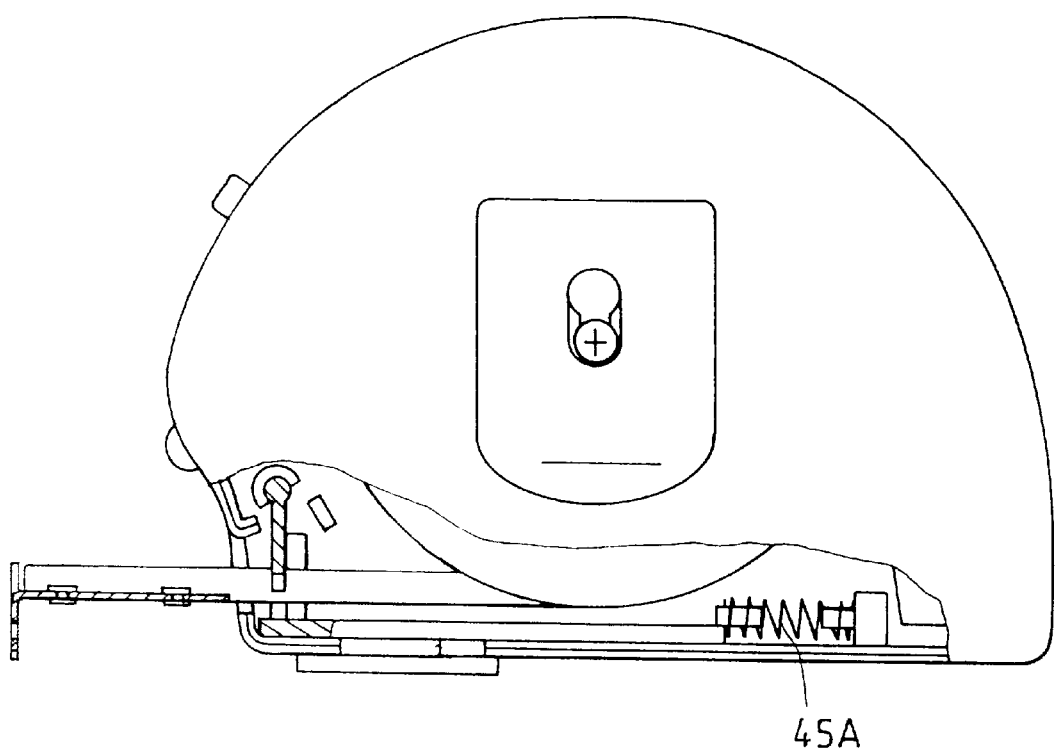
FIG. 8 shows a front view of a second preferred embodiment of the present invention with the top housing thereof being removed.

As shown in FIG. 8, the second preferred embodiment of the present invention comprises a stop member which is provided with a compression spring 45A in place of the torsion spring 45.

Figure 9:
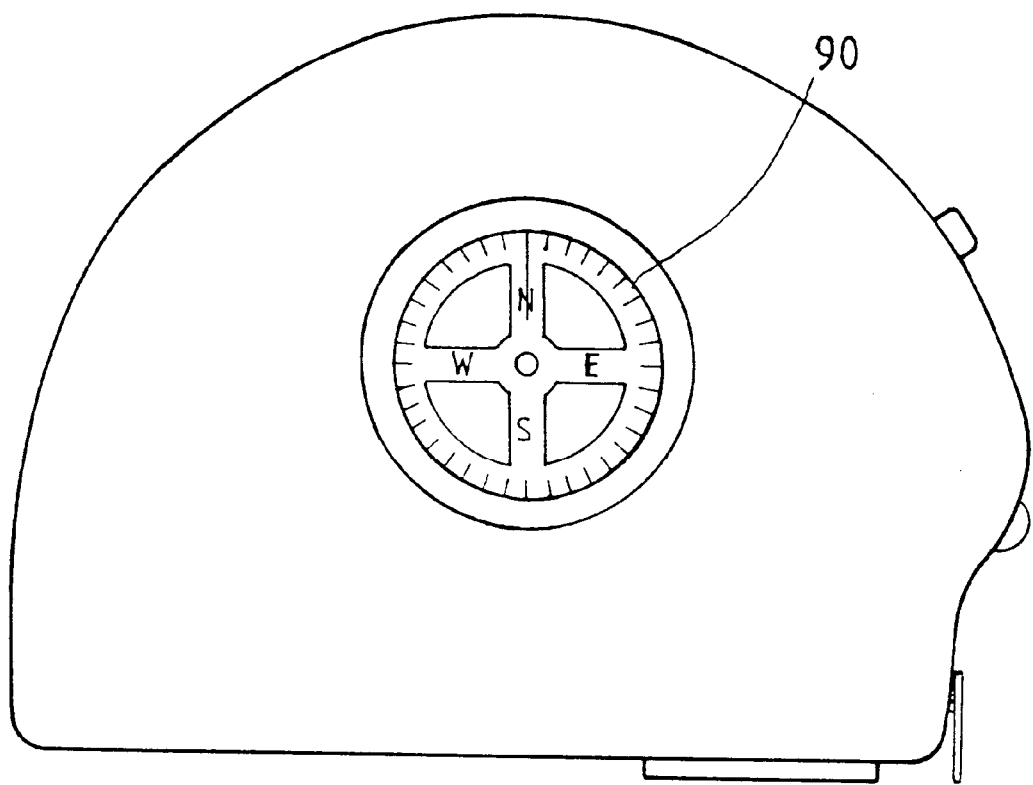
FIG. 9 shows a side view of a third preferred embodiment of the present invention which is provided with a compass.

As shown in FIG. 9, the third preferred embodiment of the present invention is provided in other side of the lug with a compass 90 opposite in location to the tape blade. The compass 90 is intended to measure the angular orientation.

As described above, the present invention can be used with ease. In addition, the stop member 40 and the arresting piece 50 work together with precision. The present invention is provided with the lighting set 30 to facilitate the use of the measuring tape at night or in a poorly-lit place. Moreover, the present invention is rather simple in construction and is cost-effective.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A measuring tape comprising:

a housing provided in the center of an interior thereof with a pivot, in the bottom thereof with an action slot, and in a front end thereof with an opening;

a reel mounted on said pivot and provided with a pliable tape blade which is wound on said reel such that a front end of said tape blade is extended out of said opening of said housing;

a stop member slidably mounted in said action slot and provided with a press portion and at least one push portion whereby said press portion has a front end urging the underside of said tape blade; and an arresting piece disposed in said housing and provided with an urging portion whereby said arresting piece is pushed by said push portion of said stop member to swivel so as to cause said urging portion to urge the upper surface of said tape blade;

said urging portion of said arresting piece being caused by friction of the upper surface of said tape blade to swivel rearward at the time when said tape blade is rewound, thereby causing said press portion of said stop member and said urging portion of said arresting piece to press against the tape blade in motion so as to stop the rewinding of said tape blade, said arresting piece capable of swiveling rearward to move away from said tape blade at such time when said stop member is pushed rearward, thereby enabling said tape blade to be rewound.

2. The measuring tape as defined in claim 1, wherein said housing is formed of a bottom housing and a top housing.

3. The measuring tape as defined in claim 1, wherein said housing is provided with a pivoting seat; and wherein said arresting piece is mounted on said pivoting seat.

4. The measuring tape as defined in claim 1, wherein said stop member is provided at other end thereof with an elastic member.

5. The measuring tape as defined in claim 4, wherein said elastic member is a torsion spring.

6. The measuring tape as defined in claim 4, wherein said elastic member is a compression spring.

7. The measuring tape as defined in claim 1 further comprising a lighting set for illuminating said tape blade.

8. The measuring tape as defined in claim 7, wherein said lighting set is formed of a lamp body, a switch, and a circuit.

9. The measuring tape as defined in claim 1 further comprising a lug whereby said lug is fastened with said housing to facilitate the holding of said housing by a tool bag or the belt of a person.

10. The measuring tape as defined in claim 1 further comprising a compass which is disposed in a side opposite to said tape blade.

* * * * *